March 8, 1960 N. E. HAYS 2,927,371
METHOD OF CONTINUOUSLY FORMING WELDED COATED STEEL TUBING
Filed Jan. 23, 1953
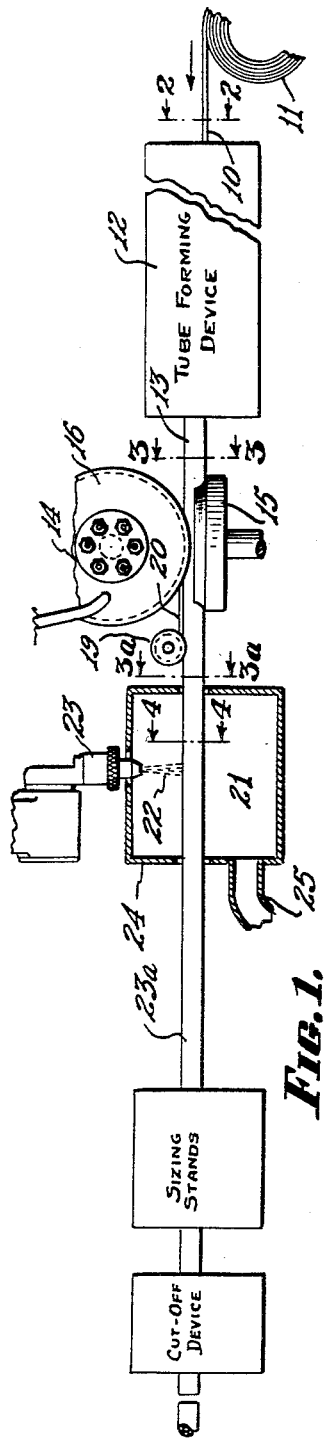
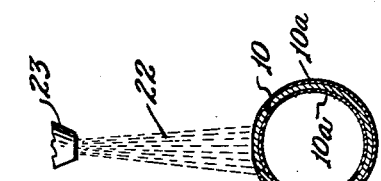
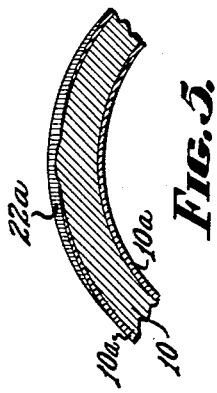
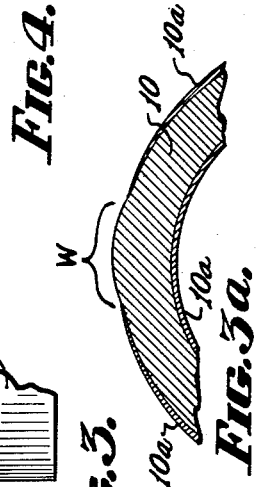
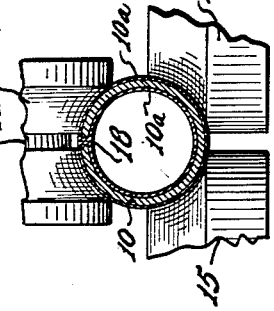
INVENTOR.
NOBLE EUGENE HAYS,
BY
ATTORNEYS.

United States Patent Office 2,927,371
Patented Mar. 8, 1960

2,927,371

METHOD OF CONTINUOUSLY FORMING WELDED COATED STEEL TUBING

Noble Eugene Hays, Middletown, Ohio, assignor to Armco Steel Corporation, Middletown, Ohio, a corporation of Ohio Application January 23, 1953, Serial No. 332,843

3 Claims. (Cl. 29—429)

This invention relates to a method of fabricating articles from coated sheet metal, apparatus used in the fabrication of coated sheet metal articles, and to the product achieved by the process. More particularly, the invention relates to the treatment of a coated metal article in the fabrication of which a welding step has been performed, and as a result of which the coating metal has been melted or burned off in the region of the weld.

While the invention is applicable to a great number of articles, it will be described herein particularly in relation to longitudinal seam welded tubing.

Longitudinal seam welded tubing is well known in the art and has been used for a great many purposes. There is a market for zinc coated metal tubing which arises from the fact that zinc coated tubing does not require costly cleaning, and painting is not required for surface protection, especially if a pre-coated strip is used in the manufacture of the tubing rather than a hot dipping operation on the finished length of tubing.

A deterrent to progress in this field has been the fact that when tubing is formed from zinc coated sheet metal and the seam is welded the coating metal is burned off or melted off in the region of the weld. This means that in order to restore the zinc coating in order to make the tubing marketable, it is necessary to replace the coating in the region of the weld. Such repair coating can be accomplished by a re-dipping of the portion of the tubing which is welded, but such operation is excessively costly and detracts from the otherwise attractive possibilities of this product.

With the foregoing considerations in mind it is an object of the present invention to provide a method for replacing or repairing the coating on a coated sheet metal article wherein the coating has been, in part at least, destroyed by a welding operation so as to provide a fully coated article.

It is another object of the invention to provide a method as outlined which will be relatively inexpensive to carry out so that it will not materially increase the cost of the finished tubing.

It is another object of the invention to provide a method as outlined which will produce a coating over the welded joint, which coating will chemically bond or fuse with the adjacent undestroyed coating so as to form a continuously coated article.

More specifically, it is an object of the invention to provide a method for fabricating coated sheet metal tubing by forming a piece of coated sheet metal into tubular condition, to weld the adjacent edges together, and then to provide a coating over the region of the weld which coating is continuous with the undisturbed coating on the remainder of the tubing.

It is yet another object of the invention to provide a combination of elements in the form of an apparatus for carrying out the method outlined above.

Still further, it is an object of the invention to provide a fabricated coated sheet metal article having a weld and having a continuous coating over said weld.

These and other objects of the invention which will be pointed out in more detail hereinafter, or which will be apparent to one skilled in the art upon reading these specifications, I accomplish by that series of method steps and by that construction and arrangement of parts, of which I shall now describe an exemplary embodiment.

Reference is made to the drawings forming a part hereof, and in which:

Figure 1 is a semi-diagrammatic elevational view with parts in section of an apparatus combination on which the method of the invention may be carried out;

Figure 2 is a cross sectional view through the coated metal strip taken on the line 2—2 of Figure 1;

Figure 3 is a fragmentary cross sectional view taken on the line 3—3 of Figure 1 showing the coated metal strip formed into a tube and in the process of being welded;

Figure 3a is a fragmentary cross sectional view on an enlarged scale showing the condition of the weld after the welding operation has been completed and the flash has been rolled down but before the repair coating has been applied;

Figure 4 is a fragmentary cross sectional view taken on the line 4—4 of Figure 1 showing the application of the repair coating;

Figure 5 is an enlarged fragmentary cross section of the upper portion of the completed tube seen in the position of Figure 4.

In recent years metal spraying or metalizing, as it is sometimes called, has become a widely used process for building up metal surfaces. This procedure is used in the rebuilding of worn shafts where molten metal is sprayed on to the worn sections of the shaft and the shaft is then ground or machined back to its original dimensions and replaced in service. This can be done at a fraction of the cost of replacing the entire shaft.

It is a well known and well understood fact in the metalizing or metal spraying industry that the base material which is to be sprayed must be suitably roughened so that the sprayed metal will adhere by a mechanical attachment. In the metalizing process molten metal is sprayed or atomized in minute droplets by means of compressed gas. Generally, a feed wire of the metal to be sprayed is continuously melted by a gas flame into the gas air blast. In this process the sprayed metal does not fuse with the base metal upon contact with the surface of the base metal. This can be demonstrated by spraying metal on to a pocket handkerchief. The sprayed metal will not burn the cloth of the handkerchief.

In connection with attempts to apply spraying procedure to the problem at hand the additional cost of abrading the region of the weld by sand blasting or wire brushing or the like is considered undesirable because of the great increase in cost.

Briefly, in the practice of the present invention I do not abrade the area to be sprayed, but have found that if zinc is sprayed on to the region of the weld immediately after the weld has been accomplished, and while the region of the weld is still at a temperature above the melting point of zinc, or the particular coating metal being used, the spray applied metal will flow and chemically bond with the adjacent undisturbed coating, and thus form a continuously coated tube. It is difficult to determine whether the spray applied coating alloys with the base metal in the weld area or not. The reason for this is that there may be a skin or oxide layer present on the surface in the weld zone. Whether or not the spray applied coating alloys with the base metal in the weld area, it has been found to have sufficient ductility and adherence to withstand the severe deformations to which the tubing may be subjected in the fabrication of various end products.

The important feature of the invention resides in the application of sprayed metal while the temperature of the base metal is above the melting point of the sprayed metal so that the sprayed-on metal will flow instead of freezing on contact and will chemically bond or fuse with the adjacent undisturbed coating. The temperature of course should not be greatly above the melting point of the sprayed-on metal because this would produce excessive alloying.

Referring now in more detail to the drawings, I have shown in Figure 1 an apparatus arrangement wherein a coated metal strip 10 is fed from a coil of such metal 11 through a tube forming device 12. This tube forming device of itself is of a well known type and need not be described herein. The strip is simply curved into tubular form into the condition best seen in Figure 3.

The formed tube 13 then passes through a welding apparatus indicated generally at 14, and which may comprise a pair of rollers 15 and a resistance welding roller 16. By means of the welding roller 16 which will have the insulated disc 17 a welding current is caused to flow across the joint to be welded and which is indicated at 18 in Figure 3. The rolls 15 support the tube from below and offer resistance to the pressure of the welding roller 16. The coating on the strip is of course exaggerated in thickness in the drawing and is indicated in Figures 2-5 inclusive at 10a.

After the weld has been accomplished by the instrumentality at 14 the flash formed in the welding operation is improved or smoothed either by a removal with a scarfing tool or by a rolling down by means of a roller. In the particular embodiment illustrated I have indicated a roller 19 for the purpose of rolling down the flash 20 formed during the welding procedure.

The condition of the tubing after it has passed the roller 19 is best illustrated in Figure 3a where it will be seen that in the region of the weld indicated by the bracket W, the coating 10a has disappeared and the weld may demonstrate a slight hump. On either side of the weld area W the coating 10a remains.

The welded tubing then passes to a spray apparatus indicated generally at 21 wherein molten coating metal is sprayed as at 22 by means of a spray gun 23 on to the region of the weld. The spray operation is preferably carried on within a housing 24 having a fume exhaust duct 25.

The condition of the finished tubing is best seen in Figure 5 where the sprayed-on coating is indicated at 22a. It will be seen that sprayed coating tapers on and merges into the coating 10a on both sides of the weld region and provides a continuous coating over the region of the weld. This has been accomplished without a roughing operation such as sand or shot blasting or wire brushing or the like. As a matter of actual fact the area has been smoothed, if anything, by the action of the flash roller 19.

The completed tubing indicated at 23 may then pass from the housing 24 through sizing stands, cut-off devices and the like.

As pointed out above the important feature of the invention involves the spraying of the coating metal on to the region of the weld at a time when the temperature of the metal in the region of the weld is still above the melting point of the coating metal. For this reason the spray instrumentality is placed relatively close to the welding instrumentality. The specific distance from the welding instrumentality 14 to the spray instrumentality 23 will of course be dictated by the melting temperature of the specific coating metal being used, the speed of the formed pipe through the welding instrumentality, and the use of coolant solutions, such that during the time that it takes any element of the welded tubing to pass from the welding instrumentality 14 to the spray instrumentality 23 it will have cooled down to a temperature not greatly above, but definitely not below the melting point of the coating metal being used.

While I have spoken primarily of repairing the coating burned off in the electrical resistance butt-welding method of forming tubing with a longitudinal seam, the process is also adaptable to other welding processes and methods of forming tubing or articles, such as spiral weld pipe welded by the submerged-arc method, as long as the above stated principles are followed: i.e., as long as the weld area is at the proper temperature and the base metal is in condition to receive the spray applied metal. For example, in the submerged-arc welding process the layer of fused flux would of course have to be removed. Although I have only used zinc coated metal tubing as an example in describing my process, this is in no respect meant to be limiting. My process is also useful in the repair of weld zones in other coated metals such as aluminum coated steel and tin coated steel.

It will of course be understood that the specific apparatus and details of the procedure may be varied without departing from the spirit of the invention, and I therefore desire that it be clearly understood that I claim as my invention not only the specific embodiment illustrated but any embodiment coming within the scope of the claims which follow.

Having now fully described my invention what I claim as new and desire to secure by Letters Patent, is:

1. A method of continuously forming welded steel tubing coated inside and out with zinc, which comprises longitudinally moving and progressively bending into tubular configuration an elongated flat steel strip or skelp which has been precoated on both sides with zinc; progressively forcing the edges of the bent moving strip into abutting relationship; progressively resistance welding the abutting edges with heat generated primarily in the outer portion of the tube wall cross-section adjacent the abutting edges to thereby form a tube, the degree of welding heat leaving the coating of zinc inside the tube substantially unaffected; and thereafter promptly spraying atomized zinc along the outside of the weld line while the temperature of the tube at the weld line remains between the melting point and the boiling point of the zinc so as to form a coating replacing that lost during the welding; the rate of travel of the steel strip through the aforementioned bending, welding and spraying being set whereby the inner coat remains substantially unaffected by the welding, and the temperature of the weld line where the sprayed zinc deposits remains between the boiling and melting point of zinc.

2. A method for continuously forming welded tubing of steel coated with a coating metal and replacing coating metal destroyed by the welding operation, which consists essentially in continously forming a flat strip of coated steel into tubular configuration and welding the adjacent edges of the formed strip, and thereafter promptly and continuously spraying additional molten coating metal along the weld line on the outside of the tubing from a point of application in close proximity to the weld point, the said point of application being so chosen that the temperature of the tube at the weld line is sufficiently high so that the additional coating metal, upon contact with the tubing, will flow instead of freezing, and will firmly bond to the uncoated areas of the tubing and fuse with the original coating remaining on the tubing, so as to thereby form a coating replacing that lost during the welding operation.

3. A method for continuously forming welded tubing of steel coated with a coating metal and replacing coating metal destroyed by the welding operation, which consists essentially in providing a flat strip of steel precoated with a coating metal chosen from the class consisting of aluminum, zinc and tin, forming the coated strip into tubular configuration and welding the adjacent edges of the formed strip, and thereafter promptly and continuously spraying additional like molten coating metal along the weld line on the outside of the tubing from a point of application lying in close proximity to the weld point, advancing the steel strip through the aforementioned forming, welding and spraying operations at a continuous rate of travel set so that the temperature of the tube at the weld line will be sufficiently above the melting point of the additional coating metal at its point of application to permit the sprayed metal to flow instead of immediately freezing, thereby causing the sprayed metal to completely cover and bond to the uncoated areas of the tubing and fuse with the original coating thereon to form a continuous coating completely surrounding the welded tubing.

References Cited in the file of this patent

UNITED STATES PATENTS

| | | |
|---|---|---|
| 1,580,647 | Breck | Apr. 13, 1926 |
| 1,866,145 | Wilson | July 5, 1932 |
| 1,895,133 | Quarnstrom | Jan. 24, 1933 |
| 1,933,279 | Quarnstrom | Oct. 31, 1933 |
| 1,978,415 | Collins | Oct. 30, 1934 |
| 1,986,704 | Bannister | Jan. 1, 1935 |
| 2,078,546 | Sebell | Apr. 27, 1937 |
| 2,166,598 | Kronquest | July 18, 1939 |
| 2,177,104 | Gonser | Oct. 24, 1939 |
| 2,224,953 | Dunkelberger et al. | Dec. 17, 1940 |
| 2,268,368 | Anderson | Dec. 30, 1941 |
| 2,360,636 | Anderson | Oct. 17, 1944 |
| 2,390,805 | Merryman et al. | Dec. 11, 1945 |
| 2,400,889 | Ridder | May 28, 1946 |
| 2,414,923 | Batcheller | Jan. 28, 1947 |
| 2,580,502 | Anderson | Jan. 1, 1952 |
| 2,581,673 | Kennedy | Jan. 8, 1952 |
| 2,588,421 | Shepard | Mar. 11, 1952 |
| 2,771,669 | Armstrong et al. | Nov. 27, 1956 |